(12) United States Patent
Wada

(10) Patent No.: US 7,663,679 B2
(45) Date of Patent: Feb. 16, 2010

(54) IMAGING APPARATUS USING INTERPOLATION AND COLOR SIGNAL(S) TO SYNTHESIZE LUMINANCE

(75) Inventor: Tetsu Wada, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 392 days.

(21) Appl. No.: 11/713,689

(22) Filed: Mar. 5, 2007

(65) Prior Publication Data

US 2007/0206104 A1 Sep. 6, 2007

(30) Foreign Application Priority Data

Mar. 6, 2006 (JP) ............................ P.2006-059945

(51) Int. Cl.
- H04N 3/14 (2006.01)
- H04N 5/335 (2006.01)
- H04N 9/04 (2006.01)
- H04N 9/083 (2006.01)

(52) U.S. Cl. ..................... 348/277; 348/222.1; 348/234

(58) Field of Classification Search ......... 348/272–277, 348/222.1, 234, 235
See application file for complete search history.

(56) References Cited

U.S. PATENT DOCUMENTS 5,323,233 A * 6/1994 Yamagami et al. .......... 348/277
6,476,865 B1 * 11/2002 Gindele et al. .............. 348/277
2006/0017829 A1 * 1/2006 Gallagher .................. 348/276
2006/0139468 A1 * 6/2006 Wada ........................ 348/272
2007/0127040 A1 * 6/2007 Davidovici ................. 356/629

FOREIGN PATENT DOCUMENTS

JP 2003-318375 A 11/2003

* cited by examiner

Primary Examiner—Lin Ye
Assistant Examiner—Gevell Selby
(74) Attorney, Agent, or Firm—Birch, Stewart, Kolasch & Birch, LLP

(57) ABSTRACT

An imaging apparatus is provided and includes a solid-state imaging device including a plurality of photoelectric conversion elements; and a image data-generation unit that generates image data represented by a first luminance signal and a color-difference signal, based on signals from the plurality of the photoelectric conversion elements. The plurality of photoelectric conversion elements include a photoelectric conversion element for obtaining a second luminance signal. In the image data-generation unit, a signal in each pixel position of image data to be generated is interpolated, a third luminance signal is generated in the each pixel position from the interpolated signal, and the first luminance signal in the each pixel position is generated by synthesizing the second and third luminance signals.

2 Claims, 3 Drawing Sheets

| y, r, g, b | y, r, g, b | y, r, g, b | y, r, g, b |
| --- | --- | --- | --- |
| y, r, g, b | y, r, g, b | y, r, g, b | y, r, g, b |
| y, r, g, b | y, r, g, b | y, r, g, b | y, r, g, b |
| y, r, g, b | y, r, g, b | y, r, g, b | y, r, g, b |

IMAGING APPARATUS USING INTERPOLATION AND COLOR SIGNAL(S) TO SYNTHESIZE LUMINANCE

BACKGROUND OF THE INVENTION

1. Field of the Invention

The present invention relates to an imaging apparatus, including a solid-state imaging device containing a plurality of photoelectric conversion elements, and a color image data-generation unit that generates color image data represented by a luminance signal and color-difference signals, based on signals from the plurality of the photoelectric conversion elements.

2. Description of Related Art

A solid-state imaging device, having a plurality of photoelectric conversion elements including photoelectric conversion elements for detecting a luminance component and photoelectric conversion elements for detecting color components of R (red), G (green) and B (blue), has been proposed (see JP-A-2003-318375).

FIG. 3 is a schematic plan view of a solid-state imaging device. The solid-state imaging device 1b illustrated in FIG. 3 includes a two-dimensional regular array, along vertical and lateral directions, of plural photoelectric conversion elements, and FIG. 3 illustrates 16 photoelectric conversion elements in total, with 4 elements in the vertical direction by 4 elements in the lateral direction. In FIG. 3, each square block represents a photoelectric conversion element, and a symbol written therein indicates a light component to be detected by such photoelectric conversion element. A symbol "Y" indicates a luminance component of the light, while "R" indicate a red component of the light, "G" indicates a green component of the light, and "B" indicates a blue component of the light. In the following description, the photoelectric conversion element marked with Y is also referred to as the photoelectric conversion element Y, that marked with R as the photoelectric conversion element R, that marked with G as the photoelectric conversion element G and that marked with B as the photoelectric conversion element B.

The solid-state imaging device illustrated in FIG. 3 has such a structure that, on a light-receiving face of each of the plural photoelectric conversion elements of same characteristics, arrayed along vertical and lateral directions, one of a Y-filter, an R-color filter which transmits an R light, a G-color filter which transmits a G light, and a B-color filter which transmits a B light is provided. The Y-filters are provided, among the photoelectric conversion elements arrayed along vertical and lateral directions, on the photoelectric conversion elements arranged in positions of a checkerboard pattern, and the R-, G- and B-color filters are provided on the photoelectric conversion element in remaining positions in the checkerboard pattern.

Thus, in the solid-state imaging device 1b illustrated in FIG. 3, in even-numbered rows, filters are arranged in an order of "Y, G, Y, G, . . . " on the individual light-receiving faces of the photoelectric conversion elements, and, in odd-numbered rows, a row containing an arrangement "R, Y, B, Y, R, . . . " and a row containing an arrangement "B, Y, R, Y, B, . . . " alternate, on the light-receiving faces of the photoelectric conversion elements.

The Y-filter is a filter having spectral characteristics correlated with luminance information and may be called a luminance filter, and an ND filter, a transparent filter, a white-colored filter and a gray-colored filter belong to this category, but a structure, in which no filter is provided on the light-receiving face of the photoelectric conversion element and the light directly enters the light-receiving face, may also be considered as a structure having a luminance filter.

Such solid-state imaging device is capable of detecting a luminance component and color components of the light separately, and can provide a resolving power for luminance not influenced by the color information, and a color reproducibility not influenced by the spectral characteristics of the luminance component.

Now, let us consider a case of generating color image data represented by a luminance signal and color-difference signals, based on the signals obtained from such solid-state imaging device.

In such case, an imaging apparatus equipped with the solid-state imaging device at first executes a signal interpolation process which interpolates, in each pixel position of the color image data to be generated and among necessary signals (4 signals including a luminance signal y and color signals r, g and b) in each pixel position of the color image data to be generated, the color signals and the luminance signal, not obtained from the photoelectric conversion element corresponding to each pixel position. For example, in a pixel position corresponding to the photoelectric conversion element Y in FIG. 3, color signals r, g and b are interpolated by the signals obtained from the photoelectric conversion elements around such photoelectric conversion element Y, and, in a pixel position corresponding to the photoelectric conversion element R in FIG. 3, signals y, g and b are interpolated by the signals obtained from the photoelectric conversion elements around such photoelectric conversion element R. Also in a pixel position corresponding to the photoelectric conversion element G in FIG. 3, signals y, r and b are interpolated by the signals obtained from the photoelectric conversion elements around such photoelectric conversion element G, and, in a pixel position corresponding to the photoelectric conversion element B in FIG. 3, signals y, r and g are interpolated by the signals obtained from the photoelectric conversion elements around such photoelectric conversion element B.

FIG. 4 illustrates a state after such signal interpolation process. In FIG. 4, each square block indicates a pixel position, and symbols in each block indicate signal components interpolated into such pixel position, wherein a symbol "y" represents a luminance signal, "r" represents a red signal, "g" a green signal and "b" a blue signal. As illustrated in FIG. 4, the luminance signal y and the color signals r, g and b are made present in each pixel position. Then the imaging apparatus generates, in each pixel position, color-difference signals Cr, Cb from the luminance signal y and the color signals r and b present therein, thereby forming color image data represented by the luminance signal y and the color-difference signals Cr, Cb.

The solid-state imaging device in the background art may utilize, as the luminance signal, not only the luminance signal y but also a luminance signal yrgb generated from the color signals r, g and b interpolated in each pixel position. In the case that the luminance filter is controlled to have such exact spectral characteristics as represented by a synthesizing equation of color signals r, g and b, there will be no difference in the color reproducibility of the luminance signal y and that of the luminance signal yrgb so that an image with satisfactory color reproducibility can be obtained even with the luminance signal y. However, when the spectral characteristics of the luminance filter y cannot be exactly controlled, the color reproducibility of the luminance signal y becomes inferior to that of the luminance signal yrgb, so that an image with satisfactory color reproducibility is difficult to generate in case of utilizing the luminance signal y. On the other hand, an image reproduction with the luminance signal yrgb provides a satisfactory color reproducibility, but the image resolution becomes inferior to the case of image reproduction with the luminance signal y.

SUMMARY OF THE INVENTION

An object of an illustrative, non-limiting embodiment of the invention is to an imaging apparatus capable of generating an image excellent in color reproducibility and resolution.

According to one aspect of the invention, there is provided an imaging apparatus comprising: a solid-state imaging device comprising a plurality of photoelectric conversion elements; and a image data-generation unit that generates image data represented by a first luminance signal and a color-difference signal, based on signals from the plurality of the photoelectric conversion elements. The plurality of the photoelectric conversion elements comprises: a first photoelectric conversion element for obtaining a first color signal; a second photoelectric conversion element for obtaining a second color signal; a third photoelectric conversion element for obtaining a third color signal, the first, second and third color signals being different from one another; and a fourth photoelectric conversion element for a second luminance signal; the fourth photoelectric conversion element being disposed adjacent to each of the first, second and third photoelectric conversion elements. The image data-generation unit comprises: a signal interpolating-unit that interpolates a signal in each pixel position of image data to be generated, wherein the signal interpolated in the each pixel position is required to generate data of the each pixel position, is selected from the first color signal, the second color signal, the third color signal and the second luminance signals, and is not obtained from a photoelectric conversion element corresponding to the each pixel position; a signal-generation unit that generates, in the each pixel position, a third luminance signal from at least three color signals including the signal interpolated in the each pixel position; and a signal-synthesis unit that synthesizes, in the each pixel position, the second luminance signal and the third luminance signal to generate the first luminance signal.

In the imaging apparatus, the signal-synthesis unit may synthesize a high frequency component of the second luminance signal and a low frequency component of the third luminance signal to generate the first luminance signal.

In the imaging apparatus, the image data-generation unit may further comprise a color-difference signal-generation unit that generates the color-difference signal based on the first luminance signal and at least one signal of the first, second and third color signals.

BRIEF DESCRIPTION OF THE DRAWINGS

The features of the invention will appear more fully upon consideration of the exemplary embodiments of the inventions, which are schematically set forth in the drawings, in which.

DETAILED DESCRIPTION OF THE EXEMPLARY EMBODIMENTS

Although the invention will be described below with reference to the exemplary embodiment thereof, the following exemplary embodiment and its modification do not restrict the invention.

According to an exemplary embodiment of the invention, an imaging apparatus capable of generating an image excellent in color reproducibility and resolution can be provided.

In the following, an exemplary embodiment of the present invention will be described with reference to the accompanying drawings.

Figure 1:
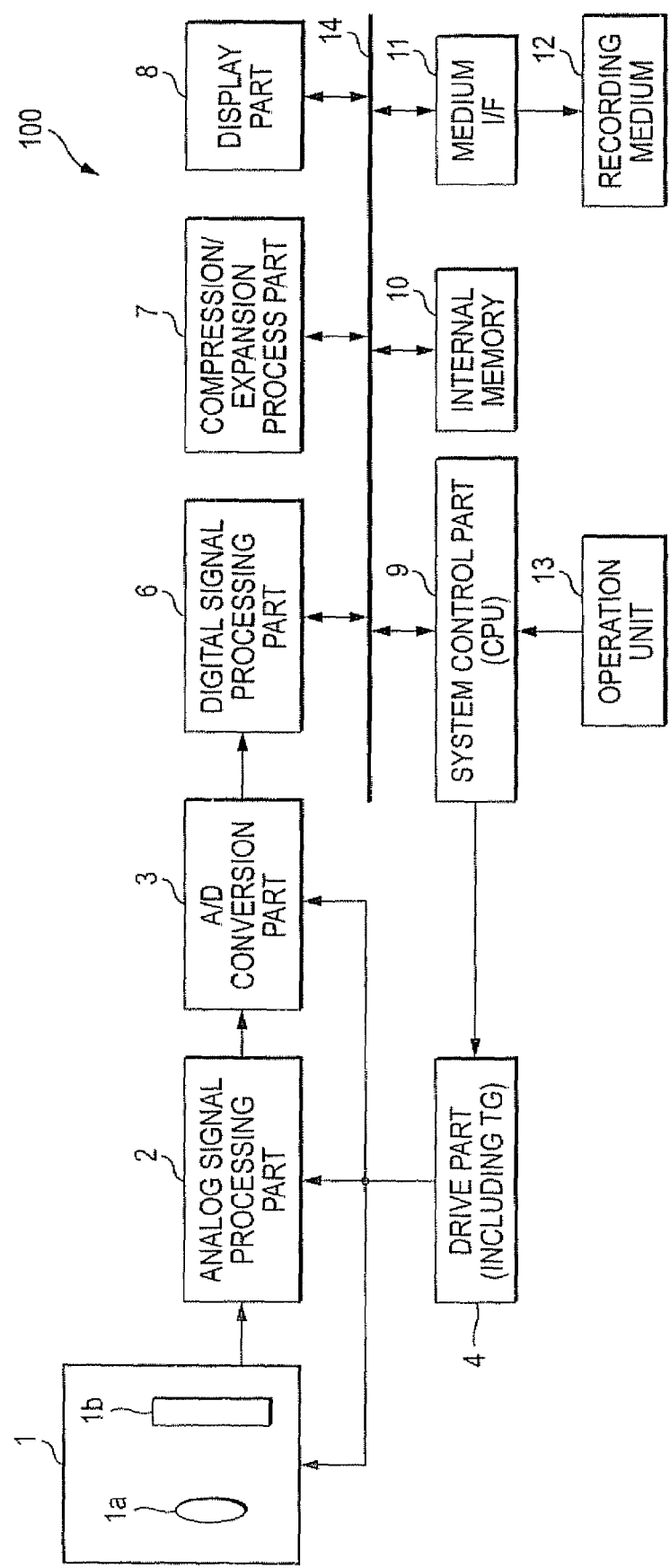
FIG. 1 is a block diagram illustrating a schematic structure of a digital camera, as an exemplary embodiment of an imaging apparatus of the invention.

FIG. 1 is a block diagram schematically illustrating a structure of a digital camera, as an exemplary embodiment of an imaging apparatus of the present embodiment.

The digital camera 100 illustrated in FIG. 1 includes an image capturing part 1, an analog signal-processing part 2, an A/D conversion part 3, a driving part 4, a digital signal-processing part 6, a compression/expansion process part 7, a display part 8, a system control part 9, an internal memory 10, a medium interface 11, a recording medium 12, and an operation unit 13. The digital signal-processing part 6, the compression/expansion process part 7, the display part 8, the system control part 9, the internal memory 10, and the medium interface 11 are connected to a system bus 14.

The image capturing part 1 captures an image of an object by an optical system including an imaging lens 1a, and a solid-state imaging device 1b of CCD type or CMOS type, and outputs an analog image signal. The solid-state imaging device 1b can have a structure illustrated in FIG. 3, so that the following description will be made with reference to FIG. 3. The analog signal-processing part 2 executes an analog signal-processing on the image signal obtained in the image capturing part 1. The A/D conversion part 3 converts the analog signal, after being processed in the analog signal-processing part 2, into a digital signal.

When the digital camera 100 is set at an image capturing mode (a mode capable of capturing an object image and recording the captured image data), the driving part 4 drives the solid-state imaging device 1b, the analog signal-processing part 2 and the A/D conversion part 3 by a drive pulse supplied from the system control part 9.

The digital signal-processing part 6 executes, on the digital signal from the A/D conversion part 3, a digital signal-processing according to an operation mode set by the operation unit 13, thereby generating captured image data. The process executed by the digital signal-processing part 6 includes a black level-correction process (OB process), a linear matrix-correction process, a white balance-regulation process, a gamma correction process, and a YC image data-generation process which generates YC image data represented by a luminance signal y' (i.e., a first luminance signal) and color-difference signals Cr' and Cb'. The digital signal-processing part 6 is constituted for example of a digital signal processor (DSP).

The compression/expansion process part 7 executes a compression process on the YC image data generated in the digital signal processing part 6, and executes an expansion process on the compressed image data obtained from the recording medium 12.

The display part 8 includes for example an LCD display apparatus, and displays an image, based on the image data captured and subjected to the digital signal processing. It also displays an image based on image data, obtained by expanding the compressed image data recorded in the recording medium 12. It can also display a passed-through image in the image capturing mode, various statuses of the imaging apparatus, and information relating to the operation.

The system control part 9 is principally constituted of a processor functioning according to a program, and executes a collective control on the entire digital camera 100, including the image capturing operation thereof.

The internal memory 10 is for example formed by a DRAM, and is used not only as a work memory for the digital signal processing part 6 and the system control part 9 but also as a buffer memory for temporarily storing the captured image data to be recorded on the recording medium 12 and as a buffer memory for the display image data for the display part 8. The medium interface 11 executes a signal exchange with the recording medium 12 such as a memory card.

The operation unit 13 is used for executing various operations in using the imaging apparatus, and includes a release button (not shown) for instructing an image capturing operation.

Figure 2:
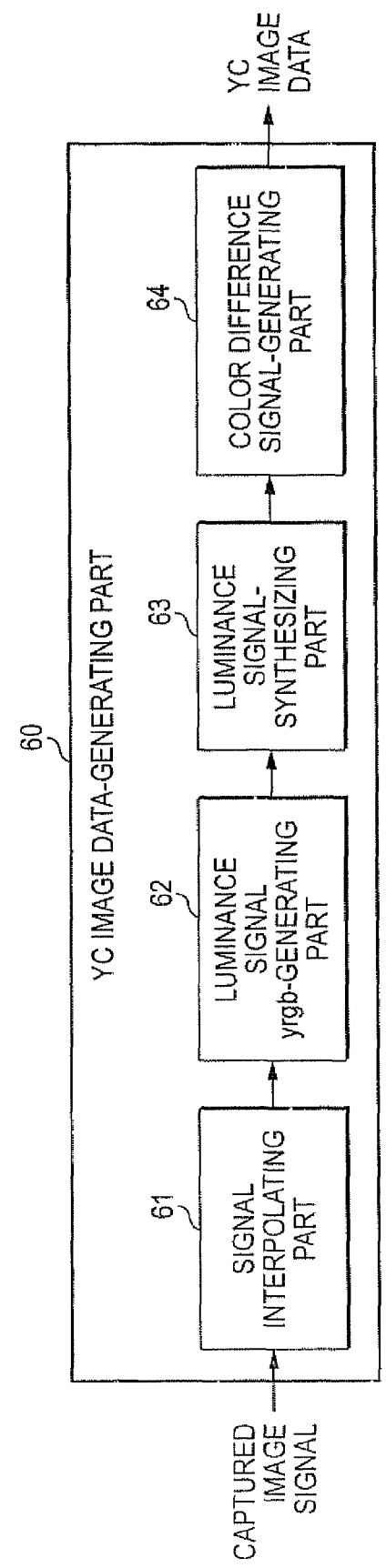
FIG. 2 is a view illustrating a schematic structure of a block for executing a YC image data-generation process, in the digital signal-processing part in FIG. 1.

FIG. 2 illustrates a schematic structure of a block for executing the YC image data-generation process, in the digital signal-processing part 6 shown in FIG. 1.

A YC image data-generating part 60, executing the YC image data-generation process, includes a signal interpolating part 61, a luminance signal yrgb-generating part 62, a luminance signal-synthesizing part 63, and a color-difference signal-generating part 64.

Figures 3, 4:
FIG. 3 is a schematic plan view of a solid-state imaging device.
FIG. 4 is a view illustrating a state after an interpolation process of signals obtained from a solid-state imaging device.

The signal interpolating part 61 executes a signal interpolation process which interpolates, in each pixel position of the color image data to be generated and among necessary signals (4 signals including a luminance signal y (i.e., a second luminance signal) and color signals r, g and b) in each pixel position of the color image data to be generated, the color signals and the luminance signal, not obtained from the photoelectric conversion element corresponding to each pixel position. For example, in a pixel position corresponding to the photoelectric conversion element Y in FIG. 3, color signals r, g and b are interpolated by the signals obtained from the photoelectric conversion elements around such photoelectric conversion element Y, and, in a pixel position corresponding to the photoelectric conversion element R in FIG. 3, signals y, g and b are interpolated by the signals obtained from the photoelectric conversion elements around such photoelectric conversion element R. Also in a pixel position corresponding to the photoelectric conversion element G in FIG. 3, signals y, r and b are interpolated by the signals obtained from the photoelectric conversion elements around such photoelectric conversion element G, and, in a pixel position corresponding to the photoelectric conversion element B in FIG. 3, signals y, r and g are interpolated by the signals obtained from the photoelectric conversion elements around such photoelectric conversion element B. The state after the signal interpolation process is same as illustrated in FIG. 4.

The luminance signal yrgb-generating part 62 generates, for each pixel position, generates a luminance signal yrgb (i.e., a third luminance signal) from the color signals r, g and b, interpolated in each pixel position, by the signal interpolating part 61. The luminance signal yrgb is generated according to a known operational formula, by a weighted addition of the signals r, g and b.

The luminance signal-synthesizing part 63 generates a luminance signal y' by synthesizing the luminance signal y and the luminance signal yrgb. More specifically, the luminance signal y' is generated by synthesizing a high-frequency component of the luminance signal y and a low-frequency component of the luminance signal yrgb.

Examples of the formula for generating the luminance signal y' are listed below. In the following formulae, LPF (signal) means a value obtained by executing a low-pass filter process on the parenthesized signal, and HPF(signal) means a value obtained by executing a high-pass filter process on the parenthesized signal:

$$y'=LPF(yrgb)+(y-LPF(y)) \qquad (1)$$

$$y'=LPF(yrgb-y)+y \qquad (2)$$

$$y'=HPF(y)+(yrgb-HPF(yrgb)) \qquad (3)$$

$$y'=HPF(y-yrgb)+yrgb \qquad (4)$$

The color-difference signal-generating part 64 generates, for each pixel position, color difference signals Cr' and Cb' from the luminance signal y' generated in each pixel position and from the color signals r and b interpolated in each pixel position.

The luminance signal y is obtained from the photoelectric conversion element Y, which is present in half a number of the plurality of the photoelectric conversion elements. Therefore, the luminance signal y becomes superior, in the frequency characteristics (resolution), to the luminance signal yrgb, but becomes inferior, in the color reproducibility, to the luminance signal yrgb. On the other hand, the luminance signal yrgb is obtained from the photoelectric conversion elements R, G and B for detecting the respective color components. For this reason, the luminance signal yrgb is superior, in the color reproducibility, to the luminance signal y, but is inferior, in the frequency characteristics, to the luminance signal y. Thus, each of the luminance signal y and the luminance signal yrgb has characteristics involving an advantage and a disadvantage.

In the digital camera described in the present embodiment, the digital signal processing part 6 generates a luminance signal y', by synthesizing a high-frequency component of the luminance signal y and a low-frequency component of the luminance signal yrgb. Thus, the luminance signal y having the satisfactory frequency characteristics is utilized in the high-frequency component affecting the resolution, and the luminance signal yrgb is utilized in the low-frequency component affecting the color reproducibility, to obtain the luminance signal y', which includes both the advantage of the luminance signal y and the advantage of the luminance signal yrgb. As a result, even in the case where the spectral characteristics of the luminance filter are uncontrollable, it is rendered possible to generate color image data satisfactory in the color characteristics and the frequency characteristics.

Respective ranges of the high-frequency component of the luminance signal y and the low-frequency component of the luminance signal yrgb may be optimally determined according to the image quality to be obtained. The range of the high-frequency component of the luminance signal y may be made wider for obtaining an image having a better resolution, and the range of the low-frequency component of the luminance signal yrgb may be made wider for obtaining an image having a better color reproducibility. The setting of such ranges may be executed by the digital signal-processing part 6, according to the image quality selected at the image capturing operation.

The foregoing description has explained a case where image data of a maximum resolving power are generated by reading signals from all the photoelectric conversion elements, but a similar process is also possible in a case of generating image data by utilizing the signals from the photoelectric conversion elements R, G and B only.

Also in the foregoing description, the plural photoelectric conversion elements contained in the solid-state imaging device 1b are assumed to include those for detecting three different color components of R, G and b. However such color components are not limited to R, G and B but may be of colors of a complementary color system or other colors. Also the number of color components is not limited to three but may be four or more.

Also in the foregoing description, each of the photoelectric conversion elements Y for obtaining the luminance signal and the photoelectric conversion elements R, G and B for obtaining color signals is arranged in a checkerboard pattern, thereby constructing a square arrangement by all the photoelectric conversion elements, but the arrangement of the photoelectric conversion elements is not limited to such case. The aforementioned effect can be obtained by any structure in which the plural photoelectric conversion elements include photoelectric conversion elements of at least three types for obtaining respectively different color signals, and photoelectric conversion elements for obtaining a luminance signal, each provided adjacent to the photoelectric conversion elements of at least three types.

While the invention has been described with reference to the exemplary embodiments, the technical scope of the invention is not restricted to the description of the exemplary embodiments. It is apparent to the skilled in the art that various changes or improvements can be made. It is apparent from the description of claims that the changed or improved configurations can also be included in the technical scope of the invention.

This application claims foreign priority from Japanese Patent Application No. 2006-59945, filed Mar. 6, 2006, the entire disclosure of which is herein incorporated by reference.

What is claimed is:

1. An imaging apparatus comprising:
   a solid-state imaging device comprising a plurality of photoelectric conversion elements; and
   a image data-generation unit that generates image data represented by a first luminance signal and a color-difference signal, based on signals from the plurality of the photoelectric conversion elements,
   wherein the plurality of the photoelectric conversion elements comprises:
   a first photoelectric conversion element for obtaining a first color signal; a second photoelectric conversion element for obtaining a second color signal; a third photoelectric conversion element for obtaining a third color signal, the first, second and third color signals being different from one another; and a fourth photoelectric conversion element for a second luminance signal, the fourth photoelectric conversion element being disposed adjacent to each of the first, second and third photoelectric conversion elements, and
   wherein the image data-generation unit comprises:
   a signal interpolating-unit that interpolates a signal in each pixel position of image data to be generated, wherein the signal interpolated in the each pixel position is required to generate data of the each pixel position, is selected from the first color signal, the second color signal, the third color signal and the second luminance signals, and is not obtained from a photoelectric conversion element corresponding to the each pixel position;
   a signal-generation unit that generates, in the each pixel position, a third luminance signal from at least three color signals including the signal interpolated in the each pixel position; and
   a signal-synthesis unit that synthesizes, in the each pixel position, the second luminance signal and the third luminance signal to generate the first luminance signal;
   wherein the signal-synthesis unit synthesizes a high frequency component of the second luminance signal and a low frequency component of the third luminance signal to generate the first luminance signal.

2. The imaging apparatus according to claim 1, wherein the image data-generation unit further comprises a color-difference signal-generation unit that generates the color-difference signal based on the first luminance signal and at least one signal of the first, second and third color signals.

* * * * *